(12) United States Patent
Sato et al.

(10) Patent No.: US 10,102,044 B2
(45) Date of Patent: Oct. 16, 2018

(54) ENABLING CONCURRENT COMMUNICATIONS BASED ON REGISTERED APPLICATION START TIME

(71) Applicant: KYOCERA Corporation, Kyoto-shi, Kyoto (JP)

(72) Inventors: Takuya Sato, Osaka (JP); Yuji Suzuki, Osaka (JP); Masaki Nono, Osaka (JP)

(73) Assignee: KYOCERA Corporation, Kyoto (JP)

( * ) Notice: Subject to any disclaimer, the term of this patent is extended or adjusted under 35 U.S.C. 154(b) by 2 days.

(21) Appl. No.: 15/243,697

(22) Filed: Aug. 22, 2016

(65) Prior Publication Data

US 2016/0357615 A1  Dec. 8, 2016

Related U.S. Application Data

(63) Continuation of application No. 14/583,068, filed on Dec. 24, 2014, now Pat. No. 9,424,069, which is a
(Continued)

(30) Foreign Application Priority Data

Jun. 25, 2012  (JP) .................................. 2012-142032

(51) Int. Cl.
  *G06F 9/54* (2006.01)
  *H04M 1/725* (2006.01)
  (Continued)

(52) U.S. Cl.
  CPC .................. *G06F 9/54* (2013.01); *G06F 9/46* (2013.01); *G06F 9/4831* (2013.01); *G06F 9/52* (2013.01);
  (Continued)

(58) Field of Classification Search
  CPC . G06F 9/46; G06F 9/4831; G06F 9/52; G06F 9/54; G06F 1/3203; G06F 1/14;
  (Continued)

(56) References Cited

U.S. PATENT DOCUMENTS 5,008,805 A * 4/1991 Fiebig ...................... G05B 9/03
  700/79
5,758,137 A * 5/1998 Armstrong, Jr. .......... G06F 1/14
  713/502
(Continued)

FOREIGN PATENT DOCUMENTS

JP  2001-045254 A  2/2001
JP  2003-005983 A  1/2003
(Continued)

OTHER PUBLICATIONS

International Search report dated Jul. 30, 2013 issued for corresponding International patent application No. PCT/JP2013/067298.

*Primary Examiner* — Benjamin C Wu
(74) *Attorney, Agent, or Firm* — Procopio Cory Hargreaves and Savitch LLP

(57) ABSTRACT

A communication terminal has communication circuit, a processor and a storing module operable to store a plurality of application programs. The terminal includes comprising: a table that a plurality of timer times are registered, a notifying module operable to notify expiration when reaching at a timer time that is registered in the table, an executing module operable to execute at least two or more application programs when the expiration is notified by the notifying module, and an enabling module operable to enable the communication circuit when executing the application program by the executing module. Communication is performed by the at least two or more application programs while the communication circuit is being enabled.

8 Claims, 14 Drawing Sheets

Related U.S. Application Data continuation of application No. PCT/JP2013/067298, filed on Jun. 25, 2013.

(51) Int. Cl.
  *H04W 52/02* (2009.01)
  *G06F 9/48* (2006.01)
  *G06F 9/46* (2006.01)
  *G06F 9/52* (2006.01)
  *G06F 1/14* (2006.01)
  *G06F 1/32* (2006.01)

(52) U.S. Cl.
  CPC ... *H04M 1/72522* (2013.01); *H04W 52/0251* (2013.01); *G06F 1/14* (2013.01); *G06F 1/3203* (2013.01); *Y02D 10/24* (2018.01); *Y02D 70/00* (2018.01)

(58) Field of Classification Search
  CPC .......... H04M 1/72522; H04W 52/0251; Y02B 60/50; Y02B 60/111; Y02D 70/00; Y02D 10/24
  See application file for complete search history.

(56) References Cited

U.S. PATENT DOCUMENTS

| | | | |
|---|---|---|---|
| 5,902,352 A | 5/1999 | Chou | |
| 6,193,422 B1 | 2/2001 | Belt | |
| 6,393,569 B1* | 5/2002 | Orenshteyn | G06F 9/5055 709/203 |
| 7,120,911 B1 | 10/2006 | Katayama | |
| 8,370,613 B1* | 2/2013 | Manadhata | G06F 9/4401 713/2 |
| 9,128,703 B1 | 9/2015 | Lachwani | |
| 2003/0061526 A1 | 3/2003 | Hashimoto | |
| 2003/0105983 A1 | 6/2003 | Brakmo | |
| 2009/0164821 A1 | 6/2009 | Drescher | |
| 2010/0107166 A1 | 4/2010 | Topaloglu | |
| 2010/0293401 A1 | 11/2010 | de Cesare | |
| 2011/0035613 A1 | 2/2011 | Rancurel | |
| 2011/0183727 A1 | 7/2011 | Kato | |
| 2012/0020393 A1 | 1/2012 | Patil | |
| 2012/0167118 A1 | 6/2012 | Pingili | |
| 2012/0210104 A1 | 8/2012 | Danko | |
| 2013/0151877 A1 | 6/2013 | Kadri | |
| 2014/0173619 A1 | 6/2014 | Nakashima | |
| 2014/0359326 A1 | 12/2014 | Tsao | |

FOREIGN PATENT DOCUMENTS

| | | |
|---|---|---|
| JP | 2003-298493 A | 10/2003 |
| JP | 2011-164677 A | 8/2011 |

* cited by examiner

FIG. 4 SECOND TIMER TABLE

| NUMBER | TIMER TIME | APPLICATION INFORMATION |
|---|---|---|
| 0001 | 2012/4/12 14:30:00 | APPLICATION 1 |
| 0002 | 2012/4/12 14:25:00 | APPLICATION 2 |
| 0003 | 2012/4/12 14:35:00 | APPLICATION 3 |
| 0004 | 2012/4/12 16:45:00 | APPLICATION 4 |
| ⋮ | ⋮ | ⋮ |

ENABLING CONCURRENT COMMUNICATIONS BASED ON REGISTERED APPLICATION START TIME

CROSS REFERENCE STATEMENT

The present application is a continuation of U.S. application Ser. No. 14/583,068 filed Dec. 24, 2014, which is bypass continuation of international patent application PCT Application No. PCT/JP2013/067298, filed on Jun. 25, 2013, entitled "Communication Terminal and Communication Control Method", which claims the benefit of Japanese Patent Application No. 2012-142032, filed on Jun. 25, 2012, entitled "Communication Terminal and Communication Control Method". The contents of which are incorporated by reference herein in their entirety.

BACKGROUND ART

Technical Field

The embodiments of the present disclosure relates to a communication terminal and communication control method.

Related Art

A communication terminal that a plurality of applications respectively perform communication is known. In a certain communication terminal, if a data amount to be transmitted per time is less than a threshold value, requested data transmission is not performed immediately while rendering a state of waiting for transmission. Then, if a certain amount of data is collected and the data amount exceeds the threshold value, a session is established to transmit a plurality of data collectively.

SUMMARY

In one or more embodiments, a communication terminal has communication circuit, a processor and a storing module operable to store a plurality of application programs that are enabled in response to expiration of a timer(s) and executed by the processor. The terminal comprises comprising: a table that a plurality of timer times are registered, a notifying module operable to notify expiration when reaching at a timer time that is registered in the table, an executing module operable to execute at least two or more application programs when the expiration is notified by the notifying module, and an enabling module operable to enable the communication circuit when executing the application program by the executing module. Communication is performed by the at least two or more application programs while the communication circuit is being enabled.

In one or more embodiments, a communication control method in a communication terminal is disclosed. The communication terminal has a communication circuit, a processor, a table that a plurality of times are registered and a storing module that stores a plurality of application programs executed by the processor. The processor of the communication terminal executes following steps of: notifying expiration when reaching at a time that is registered in the table; executing at least two or more application programs when the expiration is notified, and enabling the communication circuit when the application program is executed. Communication is performed by the at least two or more application programs while the communication circuit is being enabled.

BRIEF DESCRIPTION OF THE DRAWINGS

FIG. 4 is a schematic view showing an example of structure of second timer table data stored in a RAM shown in FIG. 1.

FIG. 7 is a schematic view showing another example of a state where the data communication is being performed by the mobile phone shown in FIG. 1.

DETAILED DESCRIPTION

First Embodiment

Figure 1:
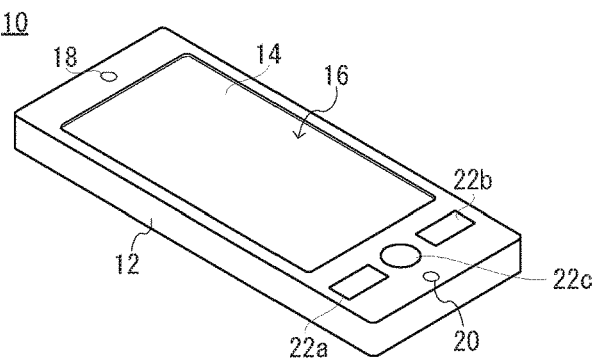
FIG. 1 is an appearance view showing a mobile phone of one or more embodiment according to the present invention.

With referring to FIG. 1, a mobile phone 10 of an embodiment according to the present invention is a smartphone as an example, and includes a longitudinal flat rectangular housing 12. However, it is pointed out in advance that the present invention can be applied to an arbitrary mobile terminal such as a tablet terminal, a PDA, etc.

A display 14 that functions as a displaying module and may be a liquid crystal, organic EL or the like is provided on a main surface (front surface) of the housing 12. A touch panel 16 is provided on the display 14. Therefore, in the mobile phone 10 of this embodiment, the most part of an input operation excepting an input by an operation of hardware keys described later is performed through the touch panel 16.

A speaker 18 is housed in the housing 12 at one end of a longitudinal direction on a side of the front surface, and a microphone 20 is housed at the other end in the longitudinal direction on the side of the front surface. As hardware keys constituting an input operating module together with the touch panel 16, a call key 22a, an end key 22b and a menu key 22c are provided, in this embodiment.

For example, a user can input a telephone number by performing a touch operation by the touch panel 16 to a dial key (not shown) displayed on the display 14, and start a telephone conversation by operating the call key 22a. If the end key 22b is operated, the telephone conversation can be ended. In addition, by long-depressing the end key 22b, it is possible to turn on/off a power supply of the mobile phone 10.

If the menu key 22c is operated, a menu screen is displayed on the display 14, and in such a state, by performing a touch operation by the touch panel 16 to software keys, menu icons or the like (both not shown) being displayed on the display 14, it is possible to select a menu and to determine such a selection.

Figure 2:
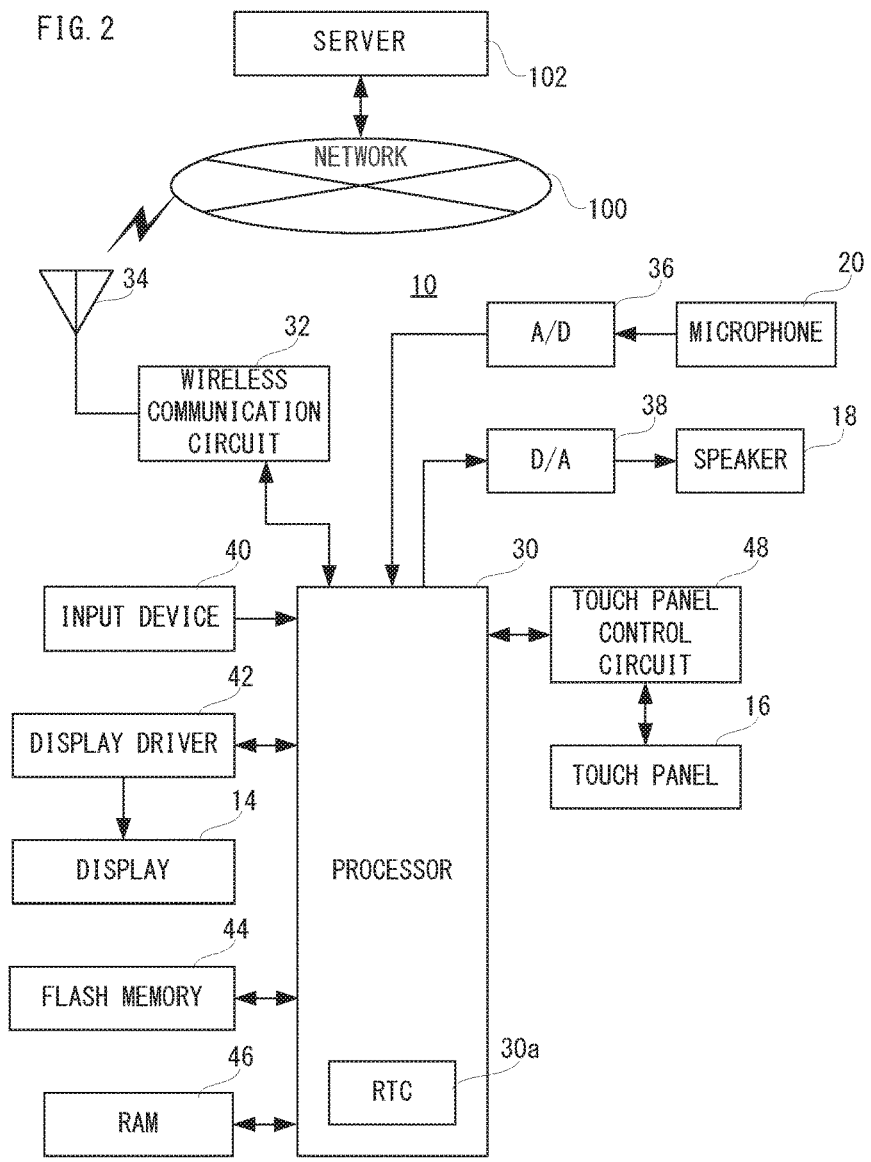
FIG. 2 is a schematic view showing electric structure of the mobile phone shown in FIG. 1.

With referring to FIG. 2, the mobile phone 10 of the embodiment shown in FIG. 1 includes a processor 30 that is called a computer or CPU. The processor 30 is connected with a wireless communication circuit 32, an A/D converter 36, a D/A converter 38, an input device 40, a display driver 42, a flash memory 44, a RAM 46, a touch panel control circuit 48, etc.

Furthermore, the wireless communication circuit 32 is wirelessly connected to a network 100 (a communication network, a telephone network) via an antenna 34. The network 100 is connected with a server 102 via a cable or wire.

The processor 30 is in charge of a whole control of the mobile phone 10. Furthermore, the processor 30 includes an RTC 30a that outputs date and time information. A whole or a part of a program set in advance in the flash memory 44 is, in use, developed into the RAM 46 that functions as a storing module, and the processor 30 operates in accordance with the program in the RAM 46. In addition, the RAM 46 is further used as a working area or buffer area for the processor 30.

For example, if a plurality of application programs are started and executed by the processor 30, the plurality of applications can be used in the mobile phone 10. Some of such applications perform data communication when executed. Hereinafter, it is simply referred to as "application is executed" that an application program is started and executed by the processor 30.

The input device 40 includes the touch panel 16 and the hardware keys 22a-22c shown in FIG. 1, and constitutes an operating module or inputting module. Information (key data) of the hardware key that the user operated is input to the processor 30.

The wireless communication circuit 32 is a circuit for transmitting and receiving a radio wave for a telephone conversation, an e-mail, etc. In the embodiment, the wireless communication circuit 32 is a circuit for performing wireless communication in a CDMA system. If the user instructs an outgoing call (telephone call) by operating the hardware key 22, for example, the wireless communication circuit 32 performs telephone call processing under instructions of the processor 30 and outputs a telephone call signal via the antenna 34. The telephone call signal is transmitted to a telephone at the other end of line through a base station and a communication network. Then, when incoming call processing is performed in the telephone at the other end of line, a communication-capable state is established and the processor 30 performs telephone conversation processing.

Specifically describing normal telephone conversation processing, a modulated voice signal sent from a telephone at the other end of line is received by the antenna 34. The modulated voice signal that is received is subjected to demodulation processing and decode processing by the wireless communication circuit 32. A received voice signal obtained through such processing is converted into a voice signal by the D/A converter 38 to be output from the speaker 18. On the other hand, a sending voice signal taken-in through the microphone 20 is converted into voice data by the A/D converter 36 to be applied to the processor 30. The voice data is subjected to encode processing and modulation processing by the wireless communication circuit 32 under instructions of the processor 30 to be output via the antenna 34. Therefore, the modulated voice signal is transmitted to the telephone at the other end of line.

When the telephone call signal from a telephone at the other end of line is received by the antenna 34, the wireless communication circuit 32 notifies the processor 30 of the incoming call. In response thereto, the processor 30 displays on the display 14 sender information (telephone number and so on) described in the incoming call notification by controlling the display driver 42. In addition, according to the above-described processing, the processor 30 outputs from the speaker 18 a ringtone (may be also called a ringtone melody, a ringtone voice).

Then, if the user performs an answering operation by using the call key 22a included in the input device 40, the wireless communication circuit 32 performs telephone incoming processing under instructions of the processor 30. Furthermore, when the communication-capable state is established, the processor 30 performs the above-described telephone conversation processing.

If the telephone conversation ending operation is performed by the end key 22b (FIG. 1) included in the input device 40 after a state is changed to the communication-capable state, the processor 30 transmits a telephone conversation ending signal to the telephone at the other end of line by controlling the wireless communication circuit 32. Then, after transmission of the telephone conversation ending signal, the processor 30 terminates the telephone conversation processing. Furthermore, in a case where the telephone conversation ending signal from the telephone at the other end of line is received, the processor 30 also terminates the telephone conversation processing. In addition, in a case where the telephone conversation ending signal is received from the mobile communication network not from the telephone at the other end of line, the processor 30 also terminates the telephone conversation processing.

The microphone 20 shown in FIG. 1 is connected to the A/D converter 36, and as described above, the voice signal from the microphone 20 is converted into digital voice data by the A/D converter 36 to be input to the processor 30. On the other hand, the speaker 18 is connected to the D/A converter 38. The D/A converter 38 converts digital voice data into a voice signal to apply to the speaker 18 via an amplifier. Therefore, a voice of the voice data is output from the speaker 18.

In addition, the processor 30 can adjust, in response to an operation of a volume by the user, a voice volume of the voice output from the speaker 18 by controlling an amplification factor of the amplifier connected to the D/A converter 38.

The display driver 42 is connected to the display 14 and the processor 30, and image data that is output from the processor 30 is stored in a VRAM of the display driver 42. Then, the display driver 42 displays on the display 14 the image corresponding to image data in the VRAM. That is, the display driver 42 controls displaying by the display 14 that is connected to the display driver 42 under instructions of the processor 30. In addition, the display 14 is provided with a backlight that includes a light source of an LED or the like, for example, and the display driver 42 controls, according to the instructions of the processor 30, brightness, lighting on/off of the backlight.

The touch panel 16 shown in FIG. 1 is connected to a touch panel control circuit 48. The touch panel control circuit 48 applies to the touch panel 16 a necessary voltage or the like and inputs to the processor 30 a touch start signal indicating a start of a touch by the user to the touch panel 16, a touch end signal indicating an end of a touch by the user, and coordinates data indicating a touch position that the user touches. Therefore, the processor 30 can determine which icon or key is touched by the user based on the coordinate data.

In the embodiment, the touch panel 16 is of an electrostatic capacitance system that detects a change of an electrostatic capacitance between electrodes, which occurs when an object such as a finger is in close to a surface of the touch panel 16, and it is detected that one or more fingers are brought into contact with the touch panel 16, for example. Furthermore, the touch panel 16 is provided on the display 14, and serves as a pointing device for designating an arbitrary position within the screen. The touch panel control circuit 48 detects a touch operation within a touch-effective range of the touch panel 16, and outputs coordinate data indicative of a position of the touch operation to the processor 30. That is, the user inputs to the mobile phone 10 an operation position, an operation direction and so on through touch, release and slide operations or through a combination of these operations on the surface of the touch panel 16.

In addition, for a detection system of the touch panel 16, a surface-type electrostatic capacitance system may be adopted, or a resistance film system, an ultrasonic system, an infrared ray system, an electromagnetic induction system or the like may be adopted. Furthermore, a touch operation is not limited to an operation by a finger, may be performed by a stylus or the like.

Figure 3:
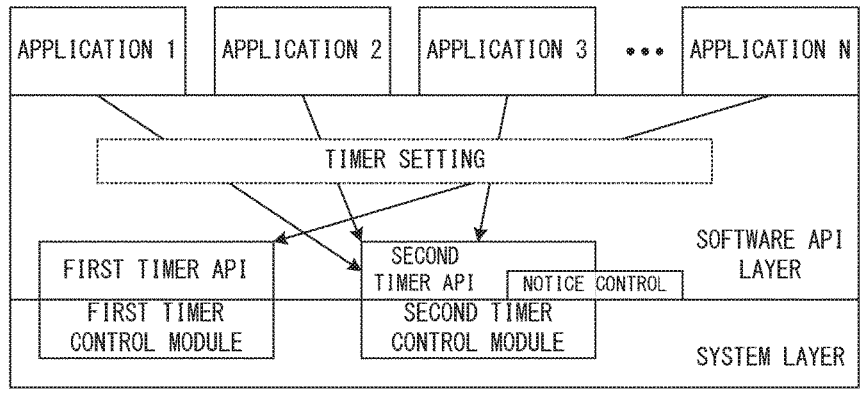
FIG. 3 is a schematic view showing an example of structure of software executed by a processor shown in FIG. 1.

FIG. 3 is a schematic view showing an example of software structure. The software structure of the mobile phone 10 comprises a system layer that includes a fundamental function such as a timer and a software API layer that includes a library for using the function of the system layer by applications. Then, the software API layer exists above the system layer, and a plurality of applications 1, 2, 3, - - - N (N is a natural number) are executed on the software API layer.

These applications can use a first timer or a second timer. For example, the application performs timer setting in a first timer control module or a second timer control module using a first timer API or a second timer API of the software API layer. If the timer setting is performed, application information (ID, name, etc.) for identifying the application that performs the setting and a time (timer time) that expiration notice is to be received to the timer control module are applied to the timer control module. The timer control module registers the application information and the timer time into a timer table.

The first timer is used by an alarm application (application N), etc. that accuracy of time that the timer expiries (timer time) is required. On the other hand, the second timer is used by an e-mail application, an SNS application, information providing applications (applications 1-3) such as a weather report, etc. that provide information, etc., which perform communication with the server 102 at predetermined intervals in the background. Therefore, the second timer may be called a communication timer or a synchronous timer.

Expiration notice is notified when the first timer or the second timer reaches at the timer time. If the expiration notice is notified, the processor 30 enables and executes an application corresponding to the expiration notice.

In addition, the first timer API and the second timer API are referred to as a "timer API" when there is no necessity of distinguishing the first timer API or the second timer API. Furthermore, when there is no necessity of distinguishing the first timer control module or the second timer control module, these are called a "timer control module."

Furthermore, since a notice control module included in the second timer API will be described later, a detailed description is omitted here.

FIG. 4 is a schematic view showing an example of structure of the timer table. In addition, since the structure of the first timer table and the structure of the second timer table are approximately the same, about the structure of the first timer table, a detailed description is omitted.

With reference to FIG. 4, columns of "number", "timer time" and "application information" are included in the second timer table. The number indicating an order that the timer setting is performed is recorded in the column of the "number." The timer time is recorded in the column of the "timer time." The application information of the application that the timer setting is performed is recorded in the column of the "application information." Then, if the timer setting is performed, a new row is added, and a number, timer time and application information are recorded in the row.

If the timer setting is performed in the application 1 in a state where nothing is recorded in the second timer table, for example, such that expiration notice is given at "2012/4/12/14:30:00", a row including the number of "0001", the timer time of "2012/4/12/14:30:00" and the application information of "application 1" is added to the second timer table. Then, if the timer time of the second application, the third application and the fourth application are registered in succession, a row including "0002", "2012/4/12/14:25:00" and "application 2", a row including "0003", "2012/4/12/14:35:00" and "application 3", and a row including "0004", "2012/4/12/16:45:00" and "application 4" are added.

Thus, if a plurality of timer times are registered, the applications respectively perform data communication individually.

Figure 5:
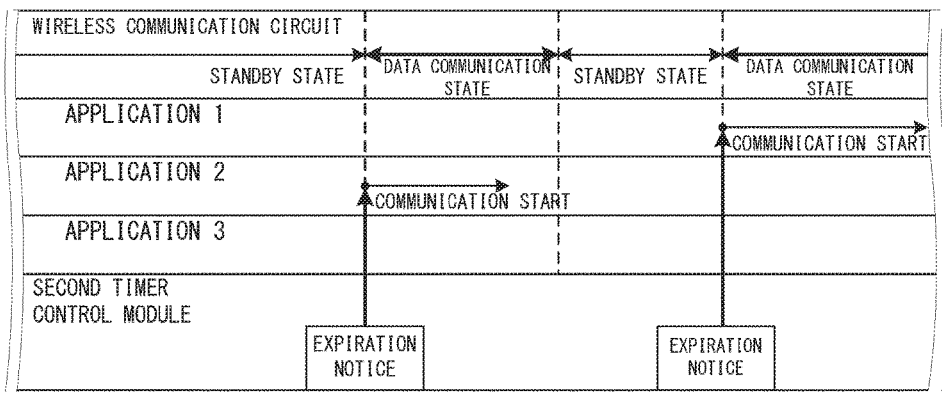
FIG. 5 is a schematic view showing an example of a state where data communication is being performed by the mobile phone shown in FIG. 1.

With reference to FIG. 5, it is notified that the timer expires when reaching at the timer time of the application 2, for example. If expiration of the timer is notified, the processor 30 executes the application 2. Furthermore, if the application 2 is executed, the wireless communication circuit 32 is enabled in response to a communication request of the application 2 to perform data communication. Then, when the data communication by the application 2 is terminated, the wireless communication circuit 32 is disabled after shifted to a dormant state.

Then, expiration of the timer is notified and the application 1 is executed when reaching at the timer time of the application 1. At this time, the wireless communication circuit 32 is enabled again to perform data communication. Then, if the data communication by the application 1 is terminated, the wireless communication circuit 32 is disabled again after shifted to a dormant state.

Thus, in the conventional art, at every time of reaching at the timer time that is registered in the second timer table, the wireless communication circuit 32 is enabled. Especially, when a plurality of applications each of which performs data communication for every predetermined time period register timer times into the second timer table, since the wireless communication circuit 32 is to be enabled frequently, the electric power consumption of the mobile phone 10 increases.

Accordingly, in this embodiment, timings that a plurality of applications perform data communication are forcedly made to be coincident with each other in order to make data communication be performed at approximately the same time. Accordingly, the number of times that the wireless communication circuit 32 is enabled is reduced and thus the electric power consumption can be suppressed.

In the first embodiment, a new timer time is registered according to the timer time that is already registered. Specifically, if a further timer time is included within an allowance time period on the basis of the timer time to be registered newly, a new timer time is registered according to the further timer time. In addition, the allowance time period is set in the following steps. First, a time period until the new timer time expires is calculated, and a time period of a predetermined rate (5%, for example) is evaluated from the calculated time period. Then, the allowance time period is set on the basis of the new timer time while using the time period of the predetermined rate.

If a timer time that is to be newly registered by the application 2 is "14:25" and a time period until reaching at that timer time is "2 hours", for example, the time period of the predetermined rate becomes "6 minutes." Then, 6 minutes before and after basing on "14:25", that is, "12 minutes" from "14:19" to "14:31" becomes the allowance time period. If the timer time of a further application is included within "12 minutes" thus set, the timer time of the application 2 is rendered the same time as the timer time of the further application.

Figure 6:
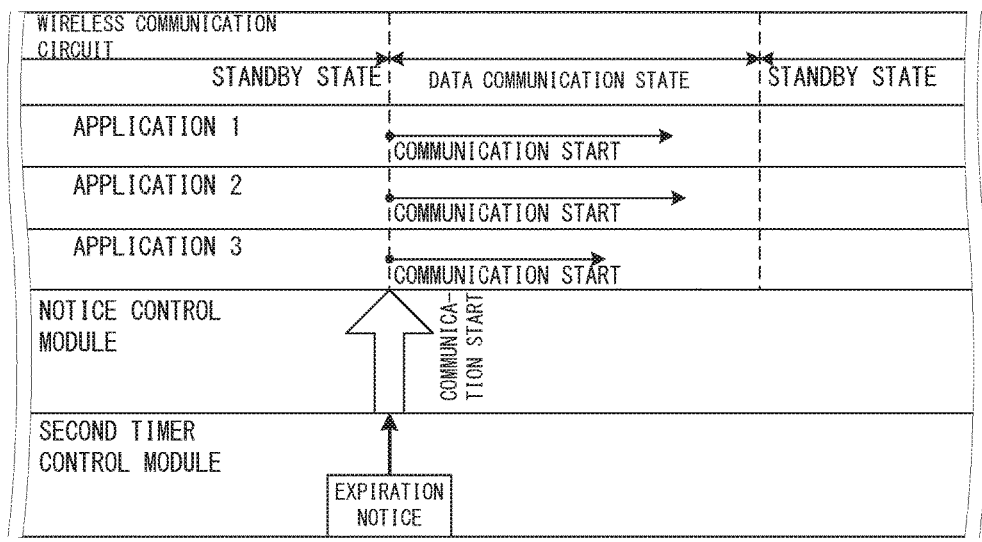
FIG. 6 is a schematic view showing another example of structure of the second timer table data stored in the RAM shown in FIG. 1.

When the timer time of the applications 1-4 mentioned above are registered based on these processing, the contents of the second timer table changes from the state of FIG. 4 to the state of FIG. 6.

With reference to FIG. 6, when the timer time ("14:30") of the application 1 is to be registered, since the timer time is the first one, the timer time is registered as it is. Next, when the timer time ("14:25") of the application 2 is to be registered, since the timer time of the application 1 is included within the allowance time period as mentioned above, the timer time of the application 2 is rendered the same timer time ("14:30") as those of the application 1. Furthermore, as similar to the application 2, the timer time of the application 3 is also registered so as to be rendered the same timer time as those of the application 1 because the timer time of the application 1 is included within the allowance time period. However, the timer time ("16:45") of the application 4 is registered as it is because the timer time of the further application is not included within the allowance time period.

With reference to FIG. 7, if the timer time is registered and the current time reaches at "14:30", the applications 1-3 are executed at approximately the same time, and the wireless communication circuit 32 is enabled. Then, the applications 1-3 respectively perform data communication while the wireless communication circuit 32 is being enabled. Then, when the data communication by the applications 1-3 are terminated, the wireless communication circuit 32 is disabled after shifted to a dormant state.

Thus, in the first embodiment, at least two or more applications can be executed by using the timer time that is already registered. Especially, it is rendered in the first embodiment that a plurality of timer times are registered while divided into groups. Then, since the data communication is performed for each group, it is possible to reduce the number of times of enabling the wireless communication circuit 32 for data communication and thus suppress a communication amount (data amount) of the data communication.

Then, as a result of performing such processing, since the number of times of enabling the wireless communication circuit 32 for data communication becomes fewer, the electric power consumption can be suppressed.

In addition, the allowance time period may be set in advance in another embodiment. Furthermore, when a plurality of timer times are included within the allowance time period, the timer time is registered according to the earliest timer time. However, in another embodiment, the timer time may be registered according to the nearest timer time (timer time that a time difference is the smallest).

Although the features of the embodiment are outlined above, in the following, the embodiment will be described in detail using a memory map shown in FIG. 8 of the RAM 46 of the mobile phone 10 and flowcharts shown in FIGS. 9-12 by the processor 30 of the mobile phone 10.

Figure 8:
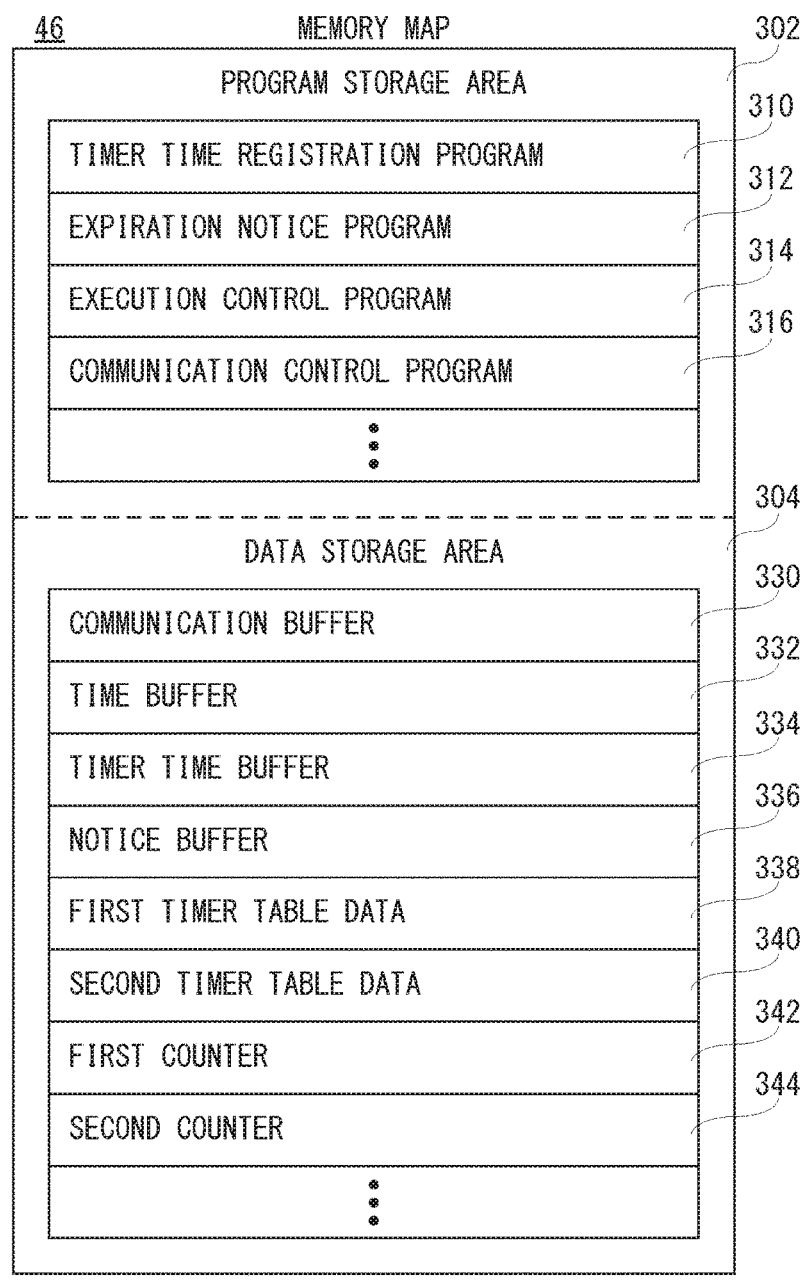
FIG. 8 is a schematic view showing an example of a memory map of a RAM shown in FIG. 2.

With reference to FIG. 8, a program storage area 302 and a data storage area 304 are formed in the RAM 46 shown in FIG. 2. The program storage area 302 is an area for reading and storing (developing) a part or all of program data that is set in advance in the flash memory 44 (FIG. 2), as described previously.

The program storage area 302 is stored with a timer time registration program 310, an expiration notice program 312, an execution control program 314, a communication control program 316, etc. The timer time registration program 310 is a program for registering a timer time into a timer table. The expiration notice program 312 is a program for notifying expiration when reaching at the timer time. The execution control program 314 is a program for executing the application in response to the expiration notice. The communication control program 316 is a program for enabling the wireless communication circuit 32 in response to a request by the application or disabling the wireless communication circuit 32 according to a state of data communication.

Furthermore, the processor 30 that executes the timer time registration program 310 and the expiration notice program 312 functions as a notice control module shown in FIG. 3.

In addition, the programs for executing a telephone function, etc. are also included in the program storage area 302.

The data storage area 304 of the RAM 46 is provided with a communication buffer 330, a time buffer 332, a timer time buffer 334, a notice buffer 336, etc. while storing first timer table data 338, second timer table data 340, etc. Furthermore, a first counter 342, a second counter 344, etc. are also provided in the data storage area 304.

Data obtained by data communication is temporarily stored in the communication buffer 330. Date and time information that the RTC 30a outputs is temporarily stored in the time buffer 332. The timer time buffer 334 temporarily stores, when timer setting is to be performed, with a timer time before registered. Notice information is temporarily stored in the notice buffer 336.

The first timer table data 338 and the second timer table data 340 are data of structure as shown in FIG. 4 (FIG. 6), and include the timer time of corresponding timers, respectively.

Since each of the first counter 342 and the second counter 344 starts a count when initialized, they may be called a first timer and a second timer. Furthermore, the first counter 342 or the second counter 344 is initialized if the timer time of the first one is registered in the first timer table data 338 or the second timer table data 340. That is, the first timer or the second timer operates if the timer time of the first one is registered in the corresponding timer table. Then, the first timer or the second timer expires when reaching at all the timer time registered into the timer table.

In addition, while image data to be displayed in a standby state, data of a character string, etc. are stored, counters and flags required for operation of the mobile phone 10 are also provided in the data storage area 304.

Figure 9:
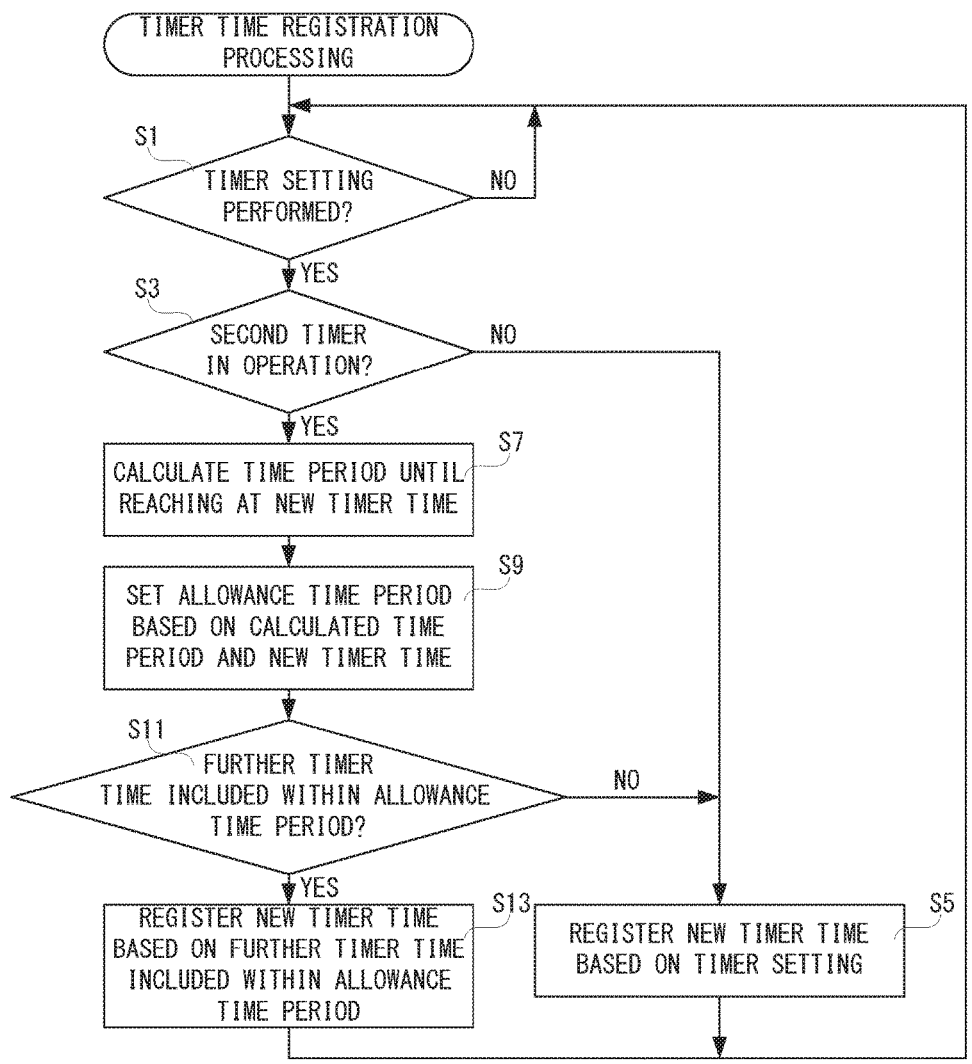
FIG. 9 is a flowchart showing an example of timer time registration processing of a first embodiment by a processor shown in FIG. 2.
Figure 10:
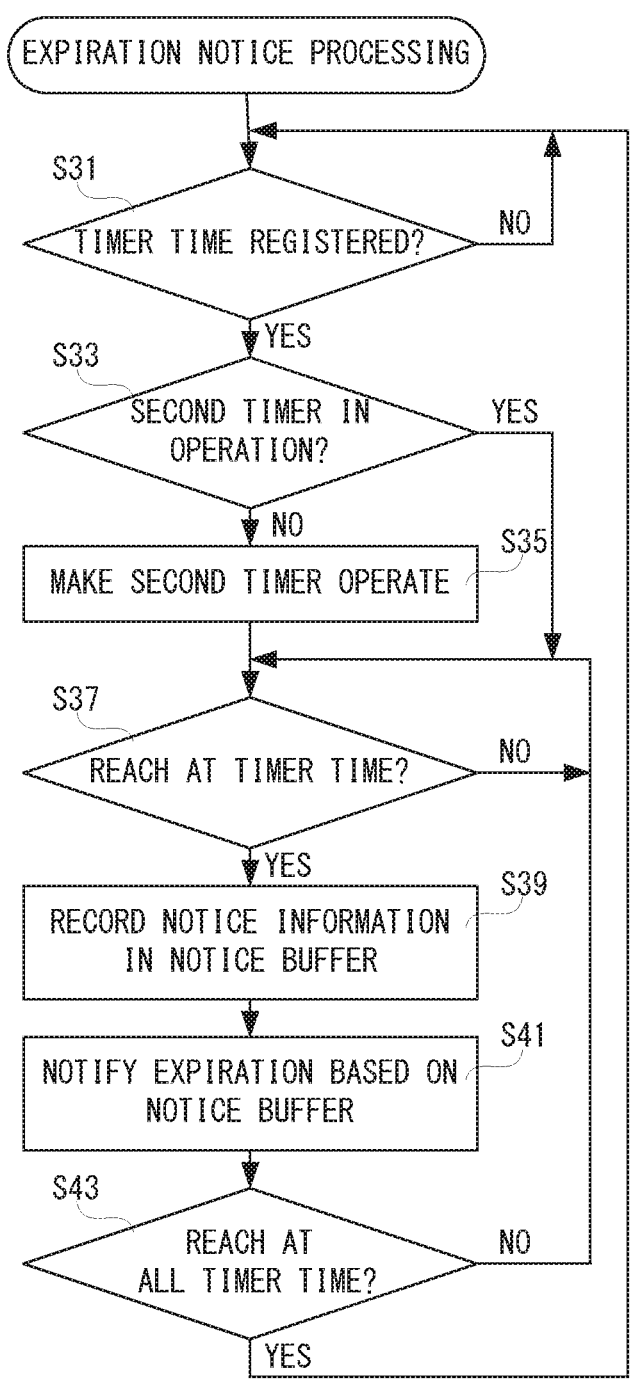
FIG. 10 is a flowchart showing an example of expiration notice processing of the first embodiment by the processor shown in FIG. 2.
Figure 11:
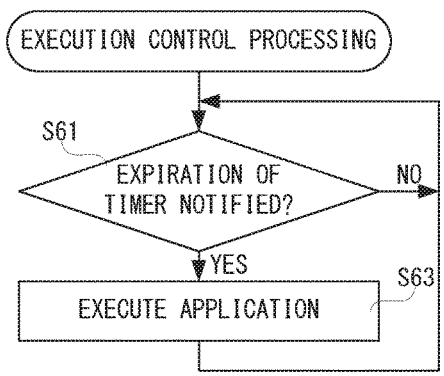
FIG. 11 is a flowchart showing an example of execution control processing by the processor shown in FIG. 2.
Figure 12:
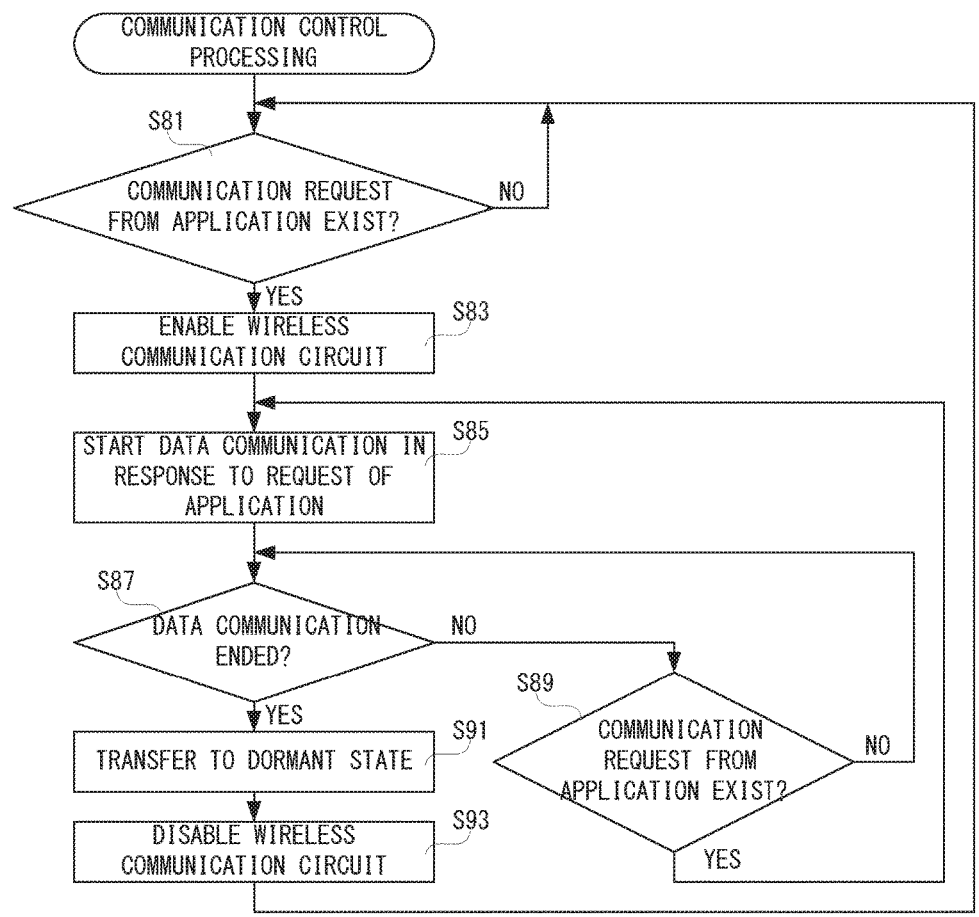
FIG. 12 is a flowchart showing an example of communication control processing by the processor shown in FIG. 2.

The processor 30 processes a plurality of tasks including timer time registration processing shown in FIG. 9, expiration notice processing shown in FIG. 10, execution control processing shown in FIG. 11, communication control processing shown in FIG. 12, etc., in parallel with each other under controls of Linux (registered trademark)-base OS such as Android (registered trademark) and REX, or other OSs.

The timer time registration processing is started when a power supply of the mobile phone 10 is turned on, for example. The processor 30 determines whether timer setting is performed in a step S1. That is, the processor 30 determines whether registration of timer time is requested by an arbitrary application. Furthermore, if the timer setting is performed, a timer time to be newly registered is temporarily stored in the timer time buffer 334. If "NO" is determined in the step S1, that is, if no application performs the timer setting, the processor 30 repeats the processing of the step S1.

If "YES" is determined in the step S1, that is, if the application 1 performs timer setting, for example, the processor 30 determines whether the second timer is in operation in a step S3. That is, the processor 30 determines whether a timer time has been registered in the second timer table 340. If "NO" is determined in the step S3, that is, if no timer time is registered in the second timer table data 340 and the second timer is not in operation, the processor 30 registers, in a step S5, a new timer time based on the timer setting. For example, the timer time stored in the timer time buffer 334 is registered into the second timer table data 340. Then, if the processing of the step S5 is ended, the processor 30 returns to the step S1. Furthermore, if the timer setting is performed by the application 2 when returning to the step S1, the processor 30 proceeds to the processing of the step S3 again.

If "YES" is determined in the step S3, that is, if the timer time is registered into the second timer table data 340 by the application 1, for example, the processor 30 calculates, in a step S7, a time period until reaching at the new timer time. If the new timer time in the timer setting by the application 2 is "14:25" and the current time is "12:25", for example, "2 hours" is calculated in the step S7. In addition, the processor 30 that executes the processing of the step S7 functions as a calculation module.

Subsequently, the processor 30 sets, in a step S9, an allowance time period based on the time that is calculated and the new timer time. Since a time period of a predetermined rate until reaching at the timer time is "6 minutes" and the timer time of a base is "14:25", for example, the allowance time period is set "12 minutes" from "14:19" to "14:31." In addition, the processor 30 that executes the processing of the step S9 functions as a setting module.

Subsequently, the processor 30 determines, in a step S11, whether a further timer time is included within the allowance time period. That is, the processor 30 determines whether the timer time to be registered into the second timer table data 340 is included within the allowance time period that is set on the basis of the new timer time. If "YES" is determined in the step S11, that is, if the timer time ("14:30") of the application 1 is included within the allowance time period of "12 minutes" from "14:19" to "14:31", the processor 30 registers, in a step S13, the new timer time on the basis of the further timer time included within the allowance time period. For example, the timer time corresponding to the application 2 is registered to be rendered the same as the timer time that has been already registered corresponding to the application 1. In addition, the processor 30 that executes the processing of the step S13 functions as the first registration module.

Furthermore, if "NO" is determined in the step S11, that is, if the further timer time is not included within the allowance time period, the processor 30 proceeds to the step S5. That is, the timer time that is stored in the timer time buffer 334 is registered into the second timer table data 340 as it is.

Thus, the timer time of the application 2 that intends to register the timer time of "14:25" is rendered the same time as the timer time ("14:30") of the application 1.

FIG. 10 is a flowchart of the expiration notice processing. If a power supply of the mobile phone 10 is turned on, for example, the processor 30 determines whether the timer time is registered in a step S31. That is, it is determined whether the new timer time is registered into the second timer table data 340. If "NO" is determined in the step S31, that is, if the timer time is not registered into the second timer table data 340, the processor 30 repeats the processing of the step S31.

Subsequently, the processor 30 determines whether the second timer is in operation in a step S33. That is, it is determined whether the timer time is registered in the second timer table 340. If "YES" is determined in the step S33, that is, if the second timer is in operation, the processor 30 proceeds to a step S37. Furthermore, if "NO" is determined in the step S33, that is, the second timer is not in operation, the processor 30 makes, in a step S35, the second timer operate. That is, the processor 30 initializes the second counter 344.

Subsequently, the processor 30 determines, in a step S37, whether reaching at a timer time. That is, the processor 30 reads the date and time information from the time buffer 332, and determines whether the timer time that is coincident with the date and time information is recorded in the second timer table. If "NO" is determined in the step S37, that is, if not reaching at the timer time, the processor 30 repeats the step S37.

If "YES" is determined in the step S37, that is, if the current time and the timer time corresponding to the application 1 are coincident with each other, for example, the processor 30 records, in a step S39, notice information in the notice buffer 336. That is, notice information including application information (ID) is stored in the notice buffer

336. Subsequently, the processor 30 notifies expiration based on the notice buffer 336 in a step S41. Reaching at the timer time of the application 1 is notified, for example.

In addition, if notified in such a way, corresponding application is executed by the execution control processing described later. Furthermore, the timer time for which the notice information is recorded is deleted from the timer table. Furthermore, the processor 30 that executes the processing of the step S39 functions as a recording module, and the processor 30 that executes the processing of the step S41 functions as a notifying module.

Subsequently, the processor 30 determines whether reaching at all the timer time in a step S43. That is, the processor 30 determines whether the timer time is registered in the second timer table data 340. If "NO" is determined in the step S43, that is, if the timer time is registered in the second timer table data 340, the processor 30 returns to the processing of the step S37. On the other hand, if "YES" is determined in the step S43, that is, if the timer time is not registered in the second timer table data 340, the processor 30 returns to the processing of the step S31.

FIG. 11 is a flowchart of execution control processing. If a power supply of the mobile phone 10 is turned on, for example, the processor 30 determines, in a step S61, whether expiration of the timer is notified. That is, the processor 30 determines whether expiration notice is notified by the expiration notice processing. If "NO" is determined in the step S61, that is, if the expiration is not notified, the processor 30 repeats the processing of the step S61. On the other hand, if "YES" is determined in the step S61, that is, if the expiration of the timer time corresponding to the application 1 is notified, for example, the processor 30 executes the application in a step S63. If the expiration notice includes the application information of the application 1, for example, the processor 30 executes the application 1 in the step S63. Then, when the processing of the step S63 is ended, the processor 30 returns to the processing of the step S61. In addition, the processor 30 that executes the processing of the step S63 functions as an executing module.

FIG. 12 is a flowchart of communication control processing. If a power supply of the mobile phone 10 is turned on, for example, the processor 30 determines whether there is any communication request from the application in a step S81. The processor 30 determines whether the application executed in the step S63 outputs a data communication request. If "NO" is determined in the step S81, that is, if there is no communication request, the processor 30 repeats the processing of the step S81. On the other hand, if "YES" is determined in the step S81, that is, if there is a communication request, the processor 30 enables the wireless communication circuit 32 in a step S83. That is, in order to perform data communication, the wireless communication circuit 32 is enabled. In addition, the processor 30 that executes the processing of the step S83 functions as an enabling module.

Subsequently, the processor 30 starts, in a step S85, data communication in response to the request from the application. The application 1 receives an e-mail, etc., for example, by starting data communication. Subsequently, the processor 30 determines, in a step S87, whether the data communication is ended. If "NO" is determined in the step S87, that is, if the data communication is not ended, the processor 30 determines, in a step S89, whether there is any communication request from the application. The processor 30 determines whether a further application is executed and data communication is requested, for example. In addition, in the step S89, it is determined whether the application under execution requests further data communication.

If "NO" is determined in the step S89, that is, if there is no communication request from the application, the processor 30 returns to the processing of the step S87. On the other hand, if "YES" is determined in the step S89, that is, if there is a communication request from the further application, the processor 30 returns to the processing of the step S85, and the data communication of the further application is started.

Furthermore, if "YES" is determined in the step S87, that is, if each data communication by a plurality of applications is ended, for example, the processor 30 shifts to a dormant state in a step S91, and disables the wireless communication circuit 32 in a step S93. Then, the processor 30 returns to the processing of the step S81.

Second Embodiment

In the second embodiment, if a plurality of timer time are registered in the second timer table data 340, a plurality of applications perform communication at approximately the same time when reaching at the latest timer time. Accordingly, it is possible to execute at least two or more applications at approximately the same time without changing the timer time that is registered.

However, if timer times are continuously registered into the second timer table data 340, the latest timer time also becomes late, and therefore, it is possible to assume that expiration of the timer is not notified. Therefore, if a first predetermined time period (15 minutes, for example) elapses after the second timer operates, at that time, expiration of a timer may be notified about what reaches at the timer time.

Furthermore, in another embodiment, if a second predetermined time period (30 minutes, for example) elapses after the second timer operates, by making the second timer forcedly expire, expiration of a timer may be notified to all the application that registers the timer time into the second timer table.

Thus, in the second embodiment, it is possible to prevent not notifying the expiration notice of the second timer even if the timer time are registered in succession.

Furthermore, a power saving mode that suppresses electric power consumption may be set into the mobile phone 10 of the second embodiment. If setting of this power saving mode, a power supply of the display 14 is turned off. The power saving mode is canceled when a user operation is performed, or an incoming call occurs, or data communication is performed. Then, in a state where the power saving mode is set, expiration notice of the timer is reserved so as not to perform data communication. Accordingly, the electric power consumed by such notice can be suppressed. Furthermore, if there is the user operation, the power saving mode is canceled, and each expiration notice being reserved becomes to be notified. That is, a user can execute the application according to a timing using the mobile phone 10.

Although the features of the second embodiment are outlined above, in the following, the second embodiment will be described in detail using a memory map of the second embodiment showing in FIG. 13 and flowcharts showing in FIG. 14-FIG. 17.

Figure 13:
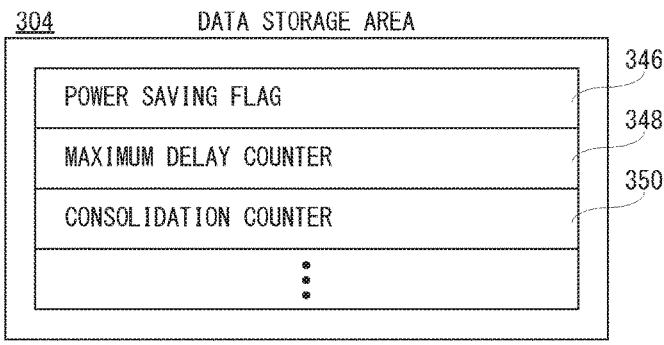
FIG. 13 is a schematic view showing another example of a memory map of the RAM shown in FIG. 2.

With reference to FIG. 13, a power saving flag 346, a maximum delay counter 348, a consolidation counter 350, etc. are further provided in the data storage area 304 of the second embodiment.

The power saving flag 346 is a flag for determining whether a power saving mode is set. The power saving flag 344 is constructed by a 1-bit register, for example. If the power saving flag 344 is turned-on (true), a data value "1" is set in the register. On the other hand, if the power saving flag 344 is turned-off (false), a data value "0" is set in the register.

The maximum delay counter 348 is a counter for measuring a first predetermined time period. The maximum delay counter 348 is also called a maximum delay timer, and starts measurement when initialized. Furthermore, the consolidation counter 350 is a counter for measuring a second predetermined time period. The consolidation counter 350 is also called a consolidation timer, and starts measurement when initialized.

Figure 14:
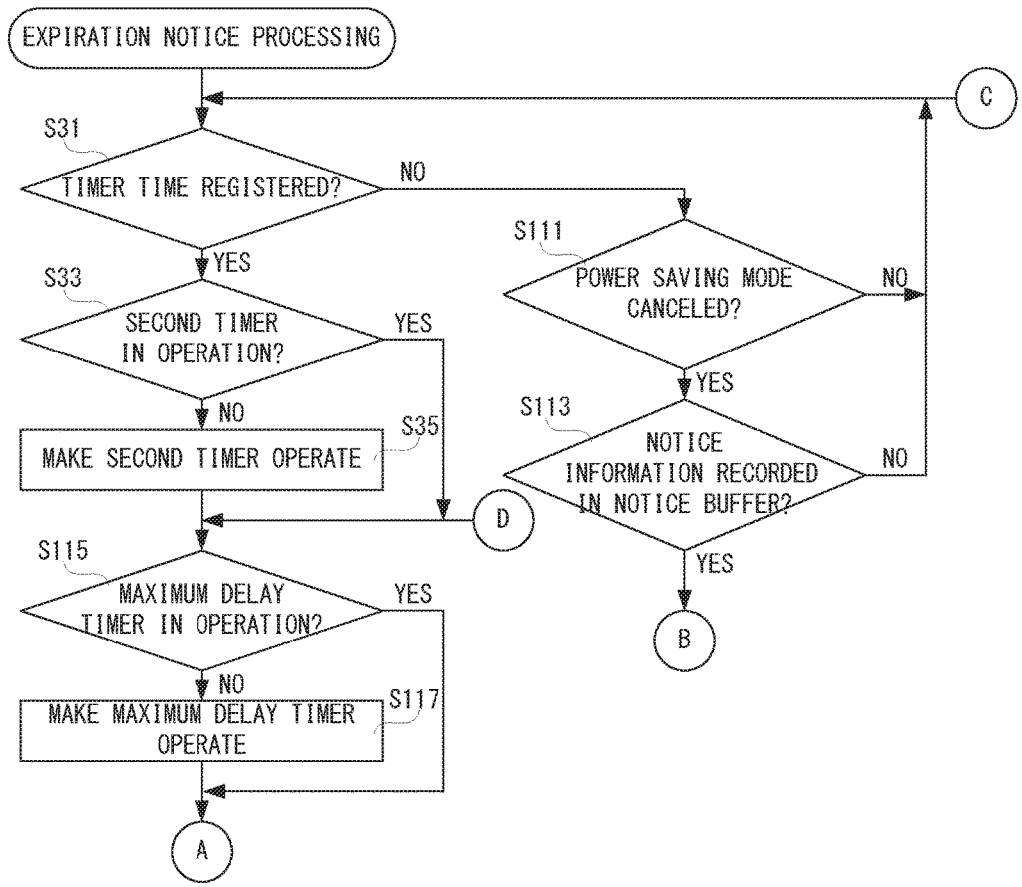
FIG. 14 is a flowchart showing an example of a part of the expiration notice processing of a second embodiment by the processor shown in FIG. 2.
Figure 15:
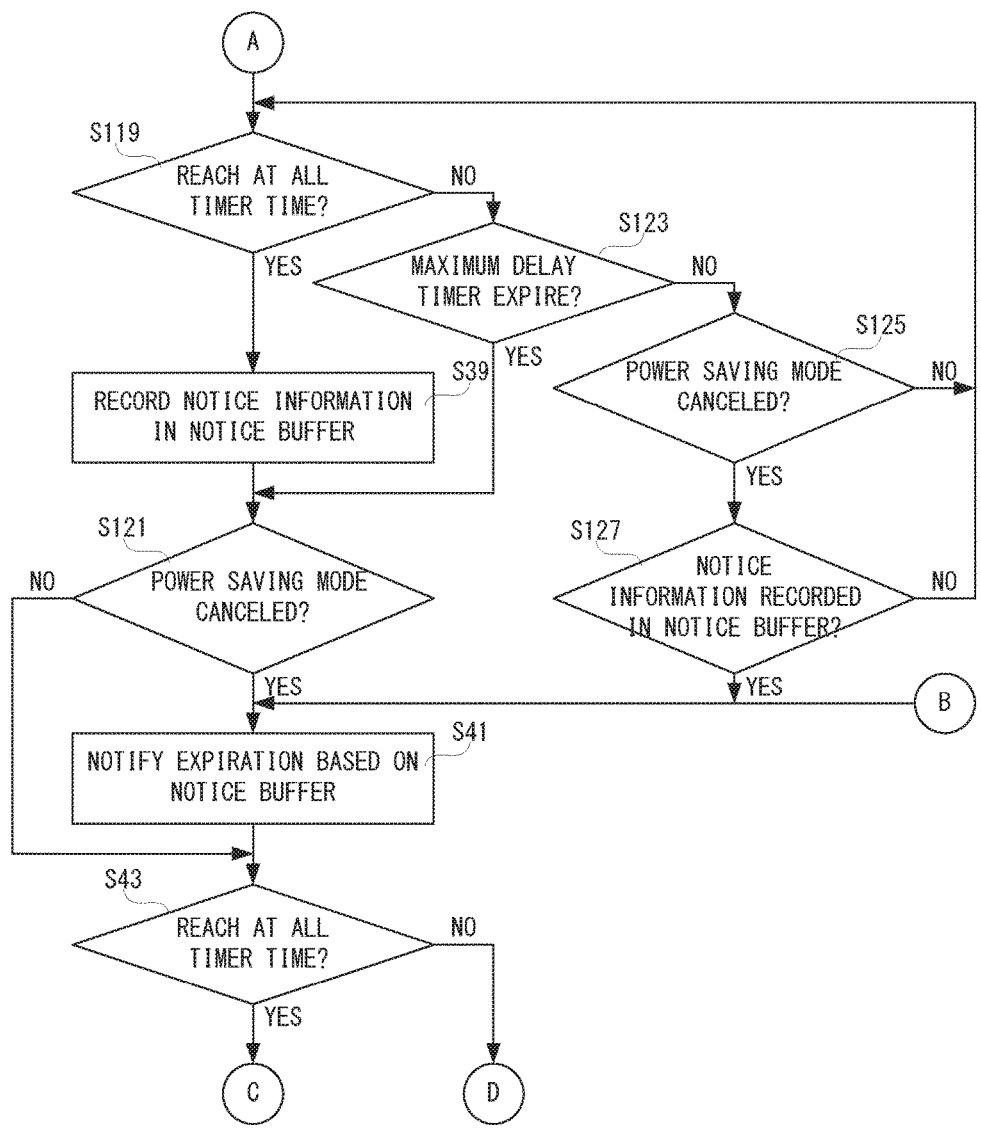
FIG. 15 is a flowchart showing another part of the expiration notice processing of the second embodiment by the processor shown in FIG. 2, following FIG. 14.

FIG. 14 is a part of a flowchart of expiration notice processing of the second embodiment. In addition, about the same processing as those of the expiration notice processing of the first embodiment, the same step numbers are applied.

If the expiration notice processing of the second embodiment is executed, in a step S31, it is determined whether a timer time is registered. If "NO" is determined in the step S31, that is, if a timer time is not registered, the processor 30 determines, in a step S111, whether the power saving mode is canceled. That is, it is determined whether the power saving flag 346 is off. If "NO" is determined in the step S111, that is, if the power saving mode is set, the processor 30 returns to the processing of the step S31. On the other hand, if "YES" is determined in the step S111, that is, if the power saving mode is canceled, the processor 30 determines, in a step S113, whether notice information is recorded in the notice buffer 336. That is, it is determined whether the expiration notice being reserved is recorded in the notice buffer 336. If "NO" is determined in the step S113, that is, if there is no expiration notice being reserved, the processor 30 returns to the processing of the step S31. On the other hand, if "YES" is determined in the step S113, that is, if expiration notice being reserved exists at a time that the power saving mode is canceled, the processor 30 notifies the expiration based on the notice buffer 336 in a step S41. Even if reaching at all the timer time currently recorded in the second timer table, for example, there is a possibility that the notice is reserved due to the power saving mode. Therefore, by executing the processing of steps S111 and S113, the expiration notice becomes to be notified if the power saving mode is canceled.

On the other hand, if "YES" is determined in the step S31, that is, if a timer time is registered, it is determined, in a step S33, whether the second timer is in operation. If "NO" is determined in the step S33, that is, if the second timer is not in operation, the processor 30 makes the second timer operate in a step S35.

Subsequently, the processor 30 determines whether the maximum delay timer is in operation in a step S115. If "NO" is determined in the step S115, that is, if the maximum delay timer is not in operation, for example, in a step S117, the processor 30 makes the maximum delay timer operate, and then, proceeds to a step S119. Thus, if the expiration notice processing is started, after the second timer operates, the maximum delay timer operates. Furthermore, if the step S115 is executed again in a state where the maximum delay timer expires and thus stops, the maximum delay timer operates again in a step S117.

Subsequently, the processor 30 determines whether reaching at all the timer time in a step S119. That is, it is determined whether reaching at the latest timer time registered in the second timer table data 340. If "YES" is determined in the step S119, that is, if reaching at all the timer time, the processor 30 records notice information in the notice buffer 336 in the step S39, and determines whether the power saving mode is canceled in a step S121.

If "YES" is determined in the step S121, that is, if the power saving mode is canceled, the processor 30 notifies expiration based on the notice buffer 336 in the step S41. If the timer times of the applications 1-3 are registered in the second timer table, the applications 1-3 are executed when the step S41 is executed. On the other hand, if "NO" is determined in the step S121, that is, if the power saving mode is being set, the expiration notice is not notified, and therefore, the processor 30 proceeds to the processing of the step S43.

The processor 30 determines, in the step S43, whether reaching at all the timer time. If "YES" is determined in the step S43, that is, if reaching at all the timer time, the processor 30 returns to the processing of the step S31. On the other hand, if "NO" is determined in the step S43, that is, if the maximum delay timer described later expires, for example, since it is in a state where the timer time is registered in the second timer table data 340, the processor 30 returns to the processing of the step S115.

Furthermore, if "NO" is determined in the step S119, that is, if not reaching at the latest timer time that is registered in the second timer table data 340, the processor 30 determines, in the step S123, whether the maximum delay timer expires. It is determined whether the first predetermined time period elapses after the second timer operates, for example. If "YES" is determined in the step S123, that is, if the maximum delay timer expires, the processor 30 proceeds to a step S121. If the power saving mode is canceled, the expiration notice that is being reserved at the time is notified, for example.

On the other hand, if "NO" is determined in the step S123, that is, if the maximum delay timer does not expire, it is determined whether the power saving mode is canceled in a step S125. If "NO" is determined in the step S125, that is, if the power saving mode is not canceled, the process returns to the processing of that step S119. On the other hand, if "YES" is determined in the step S125, that is, if the power saving mode is canceled, the processor 30 determines, in a step S127, whether notice information is recorded in the notice buffer 336. If "NO" is determined in the step S127, that is, if there is no reserved expiration notice, the processor 30 returns to the processing of the step S119. On the other hand, if "YES" is determined in the step S127, that is, if the power saving mode is canceled and there is being reserved expiration notice, before all the timer time expire or before the maximum delay timer expires, for example, the processor 30 notifies the expiration notice based on the notice buffer 336 in the step S41.

Figure 16:
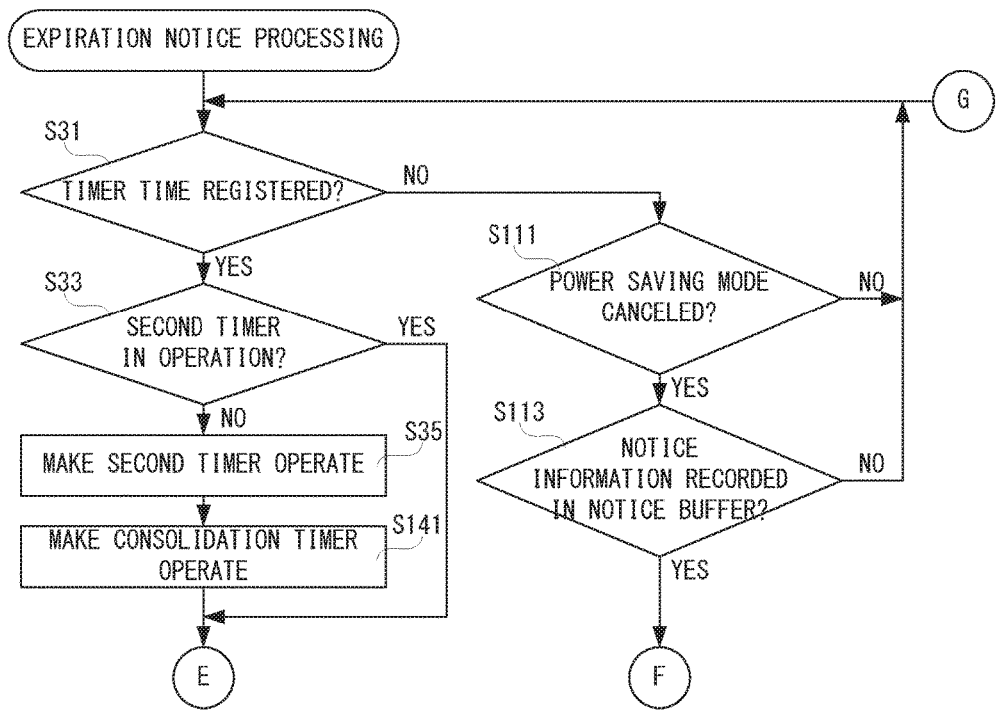
FIG. 16 is a flowchart showing an example of still another part of the expiration notice processing of the second embodiment by the processor shown in FIG. 2.
Figure 17:
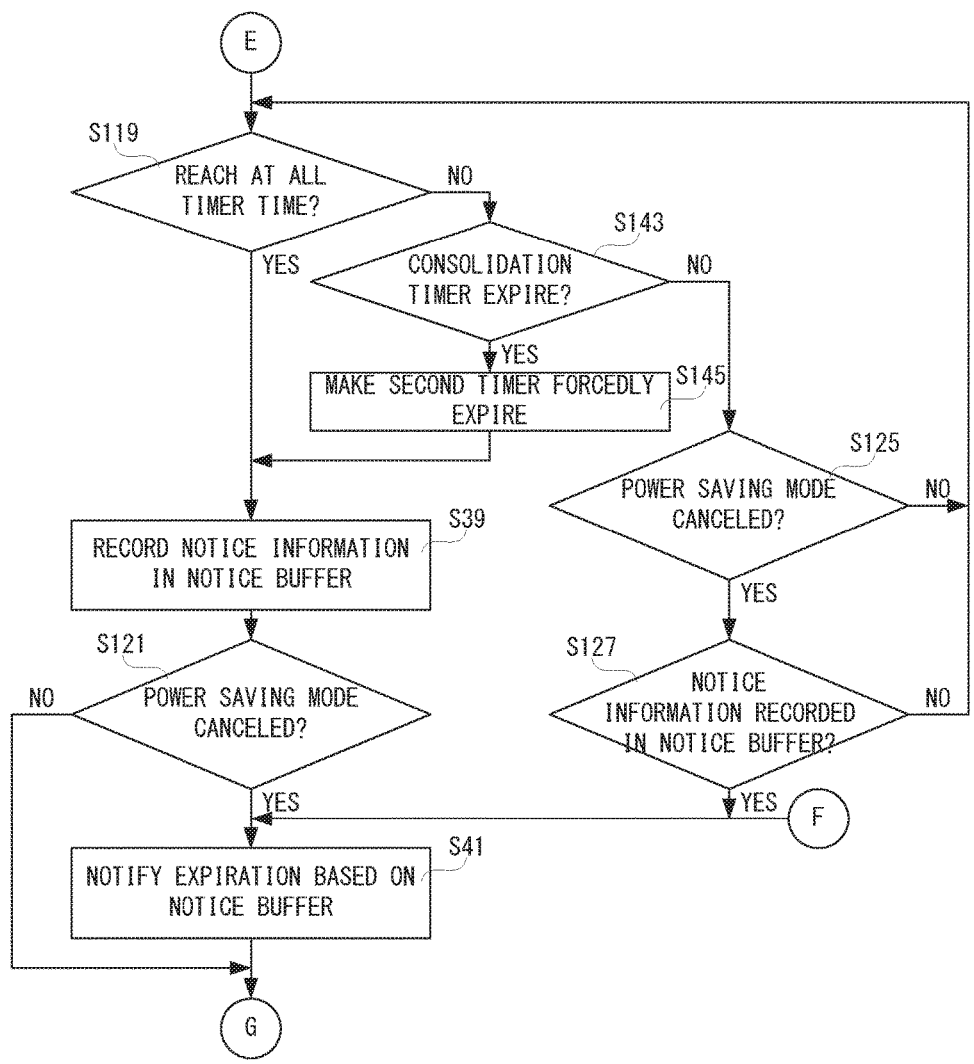
FIG. 17 is a flowchart showing the other part of the expiration notice processing of the second embodiment by the processor shown in FIG. 2, following FIG. 16.

FIG. 16 is a flow chart of expiration notice processing of the second embodiment that the consolidation timer operates in place of the maximum delay timer. In addition, about the processing already described, a description is omitted.

If the step S31 is executed and if "NO" is determined in the step S31, steps S111 and S113 are executed. On the other hand, if "YES" is determined in the step S31, that is, if the timer time is registered, it is determined, in the step S33, whether the second timer is in operation. If "YES" is determined in the step S33, that is, if the second timer is in operation, the processor 30 proceeds to a step S119. On the other hand, if "NO" is determined in the step S33, that is, if the second timer is not in operation, the processor 30 makes the second timer operate in the step S35.

Subsequently, the processor 30 makes the consolidation timer operate in a step S141. That is, in order to determine whether the second predetermined time period elapses after the second timer operates, the consolidation timer is operated.

Furthermore, if "NO" is determined in the following step S119, that is, if not reaching at the latest timer time that is registered in the second timer table data 340, the processor 30 determines, in a step S143, whether the consolidation timer expires. That is, it is determined whether the second predetermined time period elapses after the second timer operates. If "NO" is determined in the step S143, that is, if the consolidation timer does not expire, the processing of the steps S125 and S127 are executed.

On the other hand, if "YES" is determined in the step S143, that is, if the consolidation timer expires, the processor makes the second timer forcedly expire in a step S145. That is, the processor makes the second timer forcedly expire regardless of the timer time registered in the second timer table data 340. Subsequently, in the step S39, notice information is produced based on all the timer time registered in the second timer table data 340 to be recorded in the notice buffer 336. If the timer time of the applications 1-4 are registered in the second timer table data 340, for example, the notice information for the applications 1-4 are produced to be recorded in the notice buffer 336. Then, if the power saving mode is canceled, each of the applications 1-4 is executed in response to each expiration notice.

Third Embodiment

In the third embodiment, it is possible to set a simultaneous communication mode that makes a plurality of applications each performing at predetermined intervals data communication perform data communication simultaneously. Specifically, when timer setting is performed by each application, a timer time is registered such that expiration of a timer can be notified at the same time. That is, the timer times are respectively registered such that the second timer expires at a certain time.

Figure 18:
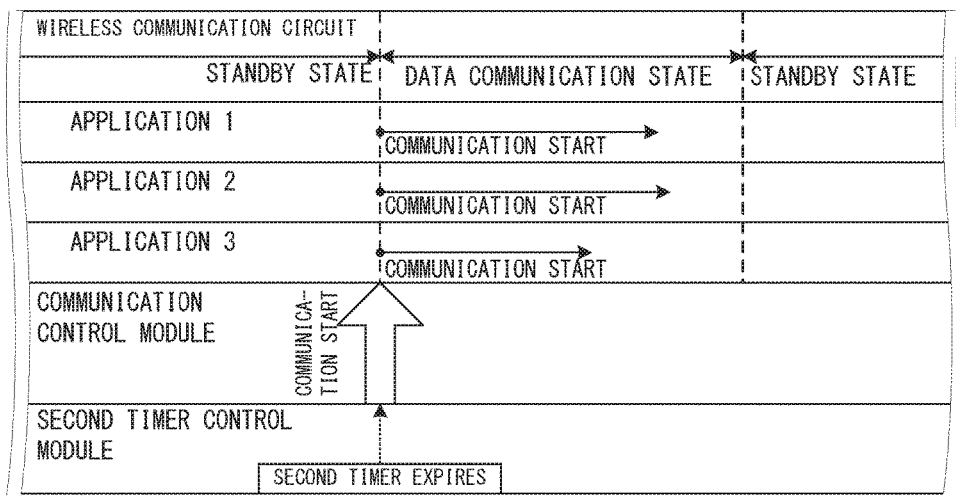
FIG. 18 is a schematic view showing a further example of a state where the data communication is being performed by the mobile phone shown in FIG. 1.

With reference to FIG. 18, even if the times that the applications 1-3 perform timer setting differs, respectively, the timer time is registered such that expiration is notified at a certain time ("14:30", for example). Therefore, if the second timer expires at the certain time, the applications 1-3 are respectively executed to perform data communication. That is, it is possible to execute all the applications that register the timer times at approximately the same time.

Figure 19:
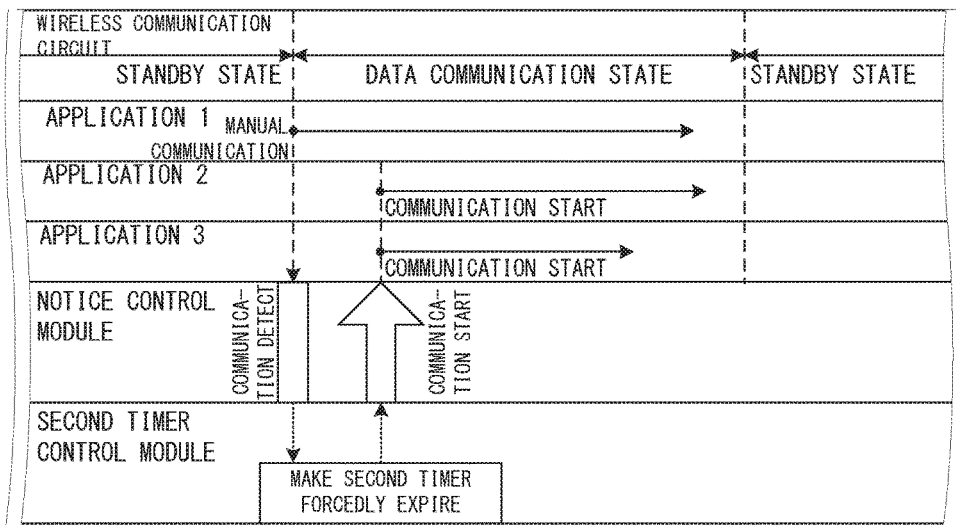
FIG. 19 is a schematic view showing the other example of a state where that data communication is being performed by the mobile phone shown in FIG. 1.

Furthermore, with reference to FIG. 19, if the data communication is performed according to the user operation, in the third embodiment, the second timer may be made to expire forcedly upon detection of the data communication. Therefore, the applications that register the timer times in the second timer table are respectively executed to perform the data communication. Thus, at least two or more applications can be executed at approximately the same time in agreement with a timing that the user performs data communication.

In addition, the user can change the setting of the simultaneous communicate mode arbitrarily. Furthermore, a set time may be arbitrarily set by the user.

Although the features of the third embodiment are outlined above, in the following, the third embodiment will be described in detail using a memory map showing in FIG. 20 and flow charts shown in FIG. 21 and FIG. 22 of the third embodiment.

Figure 20:
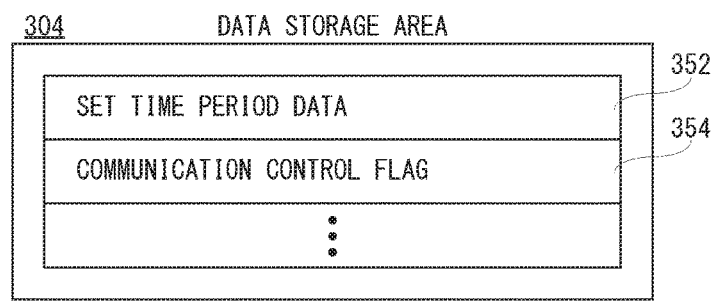
FIG. 20 is a schematic view showing the other example of a memory map of the RAM shown in FIG. 2.

With reference to FIG. 20, data storage area 304 of the third embodiment is further stored with set time period data 352 for setting the same timer time, etc. and further provided with a communication control flag 354 for determining whether the simultaneous communication mode is set, etc.

Figure 21:
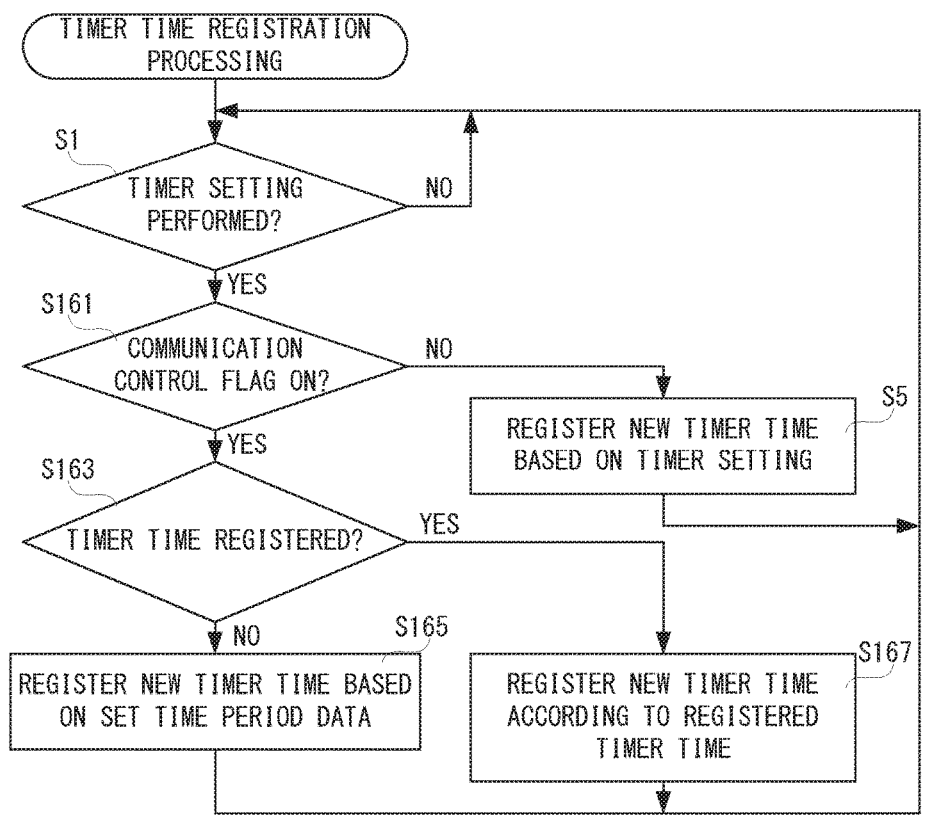
FIG. 21 is a flowchart showing an example of timer time registration processing of a third embodiment by the processor shown in FIG. 2.

FIG. 21 is a flow chart of timer registration processing of the third embodiment. In addition, the same step numbers are applied to the same processing as those of the timer registration processing of the first embodiment.

If the timer registration processing of the third embodiment is executed, the processor 30 determines, in the step S1, whether the timer setting is performed. If "YES" is determined in the step S1, that is, if the timer setting is performed, for example, the processor 30 determines, in a step S161, whether the communication control flag 354 is on. That is, it is determined whether a simultaneous communication mode is set. If "NO" is determined in the step S161, that is, if the simultaneous communication mode is not set, the processor 30 registers, in the step S5, a new timer time based on the timer setting. Then, the processor 30 returns to the processing of the step S1.

On the other hand, if "YES" is determined in the step S161, that is, if the simultaneous communication mode is set, the processor 30 determines, in a step S163, whether a timer time is registered. That is, it is determined whether a timer time is registered in the second timer table data 340.

If "NO" is determined in the step S163, that is, if a timer time is not registered into the second timer table, the processor 30 registers, in a step S165, a new timer time based on the set time period data 352. If the set time period data 354 shows "1 hour" and the timer time according to the timer setting is "13:30", the timer time of "14:30" after 1 hour shown by the set time period data 354 is registered as a new timer time. Furthermore, if the processing of the step S165 is ended, the processor 30 returns to the processing of the step S1.

If further timer setting is performed after returning to the processing of the step S1, "YES" is determined in the step S1, and if the communication control flag 354 is on, it is also determined as "YES" in the step S161. Here, since that the timer time ("14:30") is registered in the second timer table data 340, it is determined as "YES" in the step S163, and the processor 30 proceeds to the processing of a step S167. The processor 30 registers, in the step S167, a new timer time in agreement with the timer time that is registered. Here, since the timer time "14:30" is registered in the second timer table data 340, the new timer time is also registered as "14:30." Furthermore, if the processing of the step S167 is ended, the processor 30 returns to the step S1.

In addition, the processor 30 that executes the processing of the step S165 and step S167 functions as a second registration module.

Figure 22:
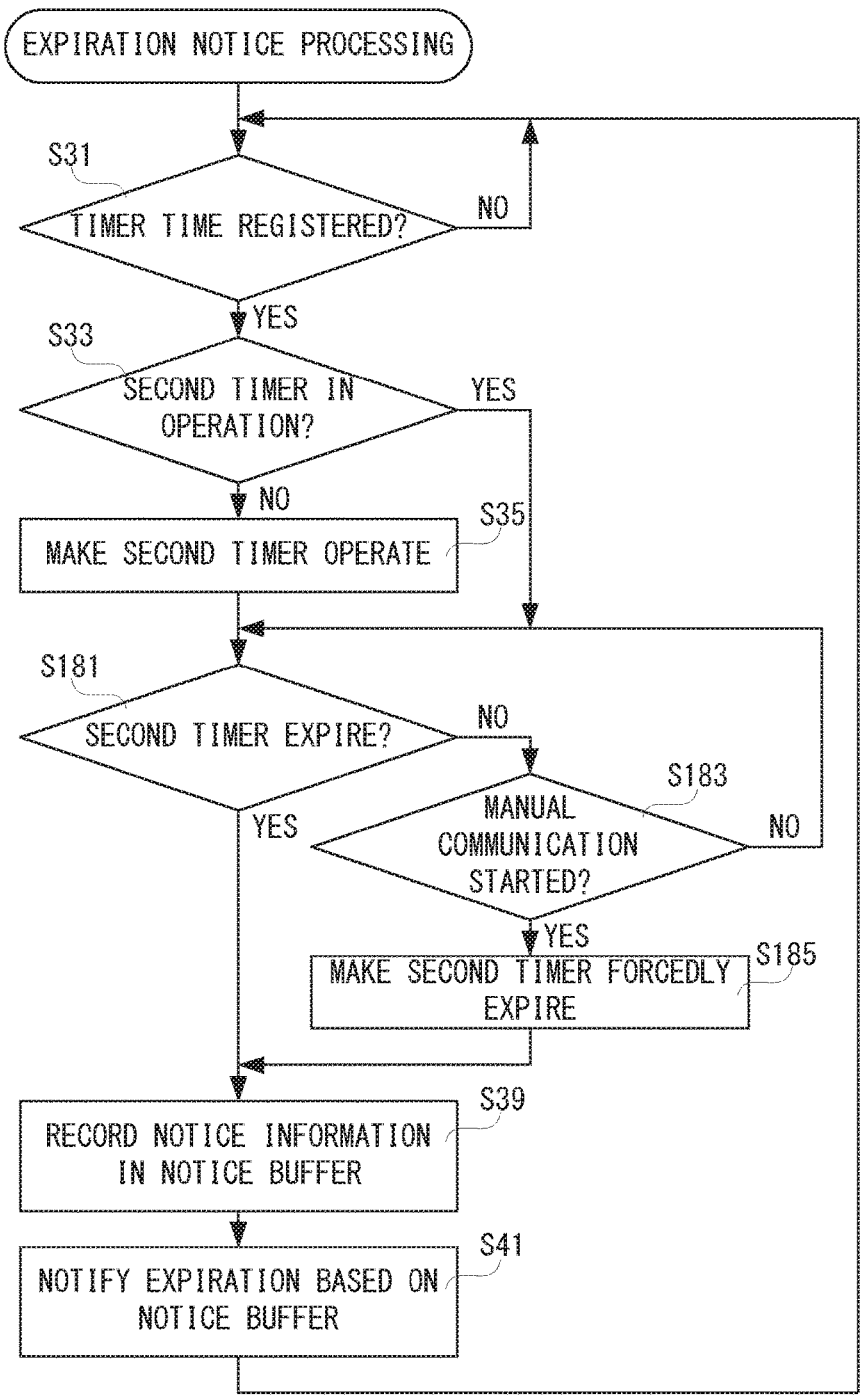
FIG. 22 is a flowchart showing an example of expiration notice processing of the third embodiment by the processor shown in FIG. 2.

FIG. 22 is a flow chart of expiration notice processing of the third embodiment. In addition, the same step numbers are applied to the same processing as those of the expiration notice processing of the first embodiment.

If the expiration notice processing of the third embodiment is started, the processor 30 executes the processing from the step S31 to the step S35.

If the second timer is operated in the step S35, the processor 30 determines, in a step S181, whether the second timer expires. That is, it is determined whether reaching at the timer time that is registered in the second timer table data 340. If "YES" is determined in the step S181, that is, if the second timer expires, the processor 30 records notice information in the notice buffer 336 in the step S39 and notifies expiration based on the notice buffer in the step S41. Then, if the processing of the step S41 is ended, the processor 30 returns to the processing of the step S31.

Accordingly, the applications that register the timer times perform the data communication at approximately the same time.

On the other hand, if "NO" is determined in the step S181, that is, if the second timer does not expire, the processor 30 determines, in a step S183, whether communication is started manually. It is determined whether the user executes an arbitrary application to perform an operation in which communication is to be performed. If "NO" is determined in the step S183, that is, if the communication is not performed according to the user operation, the processor 30 returns to the processing of the step S181.

On the other hand, if "YES" is determined in the step S183, that is, if the communication is performed according to the user operation, the processor 30 makes the second timer forcedly expire in a step S185. That is, the processor makes the second timer forcedly expire regardless the timer time registered in the second timer table data 340. Then, the processor 30 executes the processing of the steps S39 and S41, and notifies expiration of the second timer.

In addition, also in the first embodiment and the third embodiment, the power saving mode may be set and the notice may be reserved. Furthermore, also in the first embodiment and the second embodiment, the second timer may be made to forcedly expire in response to the user operation.

Furthermore, although the application is executed when reaching at the timer time in this embodiment, the application may be executed when the timer period elapses after the timer setting is performed. In this case, the timer period is registered in the timer table in place of the timer time.

Furthermore, an application that acquires news with predetermined intervals, an application that backs up the flash memory 44 with predetermined intervals, etc. may be included in the application that performs the data communication.

The programs used in the embodiments may be stored in an HDD of the server for data distribution, and distributed to the mobile phone 10 via the network. A plurality of programs may be stored in a storage medium such as an optical disk of CD, DVD, BD (Blu-ray Disc) or the like, a USB memory, a memory card, etc., and then, such the storage medium may be sold or distributed. In a case where the programs downloaded via the above-described server or storage medium are installed to a mobile terminal having the structure equal to the structure of the embodiments, it is possible to obtain advantages equal to the advantages according to the embodiments.

The specific numerical values mentioned in this specification are only examples, and changeable appropriately in accordance with the change of product specifications.

It should be noted that reference numerals inside the parentheses and the supplements show one example of a corresponding relationship with the embodiments described above for easy understanding of the present invention, and do not limit the present invention.

An embodiment is a communication terminal having a communication circuit, a processor and a storing module operable to store a plurality of application programs that are started in response to expiration notice of a timer(s) and executed by the processor, comprising: a table that a plurality of timer times are registered; a notifying module operable to notify expiration notice when reaching at a timer time that is registered in the table; an executing module operable to execute at least two or more application programs when the expiration notice is notified by the notifying module; and an enabling module operable to enable the communication circuit when executing the application program by the executing module, wherein communication is performed by at least two or more application programs while the communication circuit is being enabled.

In this embodiment, the communication terminal (10: reference numeral exemplifying a module corresponding in the embodiment, and so forth) has the communication circuit (32) that performs wireless communication, the processor (30) for controlling the whole communication terminal and storing module (46) such as a RAM, and the storing module is stored with a plurality of application programs that are started in response to the expiration notice of the timer(s) and executed by the processor. The table (340) is stored in the storing module, for example, and a plurality of timer times are registered therein. The notifying module (30, S41) notifies the expiration notice when reaching at one timer time that is registered. In response to the expiration notice, the executing module (30, S63) starts and executes at least two or more application programs, respectively. The enabling module (30, S83) enables the communication circuit if the application program is executed. Then, the communication is performed by at least two or more executed application programs while the communication circuit is being enabled.

According to the embodiment, since the number of times of enabling the communication circuit for data communication becomes fewer, the electric power consumption can be suppressed.

Another embodiment further comprises a first registration module that registers, when a timer time is to be registered into the table, a timer time into the table based on a further timer time if the further timer time is included within an allowance time period on the basis of the timer time to be registered.

In this embodiment, when newly registering a timer time, a further timer time may already be registered. In such a case, the first registration module (30, S13) registers the new timer time such that the new timer time becomes the same time as the further timer time.

According to this embodiment, it is possible to execute at least two or more application programs at approximately the same time by using an already registered timer time.

A further embodiment further comprises a calculation module operable to calculate, when a timer time is to be registered into the table, a time period until reaching at the timer time; and a setting module that sets an allowance time period based on the time period calculated by the calculation module and a timer time that is to be newly registered.

In the further embodiment, when a timer time is to be newly registered, the calculation module (30, S7) calculates a time period (2 hours, for example) until the timer time expires. The setting module (30, S9) evaluates a time period (6 minutes, for example) of a predetermined rate from the time until expiring, and sets the allowance time period (12 minutes from "14:19" to "14:31") on the basis of the new timer time ("14:25").

According to the further embodiment, a plurality of timer times are registered while divided into a plurality of groups. Therefore, since the data communication is performed for each group, it is possible to reduce the number of times of enabling the communication circuit for data communication and thus suppress a data amount (amount of communication) of data communication.

In a still further embodiment, the notifying module notifies expiration notice when reaching at a latest timer time out of a plurality of timer times.

In the still further embodiment, the notifying module notifies the expiration notice to at least two or more applications when reaching at the latest timer time out of the timer times that are registered in the timer table.

According to the still further embodiment, it is possible to execute at least two or more application programs at approximately the same time without changing the timer time that is registered.

A yet further embodiment further comprises a timer that operates when a first one of the timer time is registered into the table, wherein the notifying module notifies the expiration notice if reaching at the timer time out of the plurality of timer times when a first predetermined time period elapses after the timer operates.

In the yet further embodiment, the timer (the second timer) operates if the first of the timer time is registered into the table. The notifying module notifies the expiration notice if reaching at the timer time out of the plurality of timer times after the first predetermined time period elapses. Accordingly, the application program corresponding to the expiration notice is executed.

A yet till further embodiment further comprises a timer that operates when a first one of the timer time is registered into the table, wherein the notifying module notifies the expiration notice when a second predetermined time period elapses after the timer operates.

In the yet still further embodiment is further provided with the timer like the yet further embodiment. The notifying module notifies the expiration notice if the second predetermined time period elapses after the timer operates. Accordingly, data communication is performed at approximately the same time by the application programs corresponding to the timer times registered.

According to the yet further embodiment and the yet still further embodiment, it is possible to prevent not notifying the expiration notice even if the timer time is continuously registered.

In a further embodiment, the storing module further stores a set time period, and further comprises a second registration module that registers, when a timer time is to be registered, a timer time into the table based on the set time period.

In the further embodiment, the storing module further stores the set time period for registering a timer time that becomes a base. The second registration module (30, S165, S167) registers a timer time based on the set time period.

According to the further embodiment, it is possible to execute all the application programs each registering the timer time at approximately the same time.

In a still further embodiment, the notifying module notifies the expiration notice when the communication circuit is enabled in response to an operation.

In the still further embodiment, the notifying module notifies the expiration notice if the communication circuit is enabled according to a user operation.

According to the still further embodiment, it is possible to execute at least two or more application programs at approximately the same time according to the timing that a user performs data communication.

In a yet further embodiment, the expiration notice is reserved when reaching at least one or more timer times out of the plurality of timer times in a state where a power saving mode that suppresses electric power consumption.

In the yet further embodiment, if the power saving mode is set, the expiration notice is reserved when reaching at least one or more timer times out of the plurality of timer times.

According to the yet further embodiment, it is possible to suppress the electric power that is consumed by the notice.

A yet still further embodiment further comprises a recording module that records information of the expiration notice being reserved, and the notifying module notifies based on the information of the notice expiration if the information of the expiration notice is recorded by the recording module when the power saving mode is canceled.

In the yet still further embodiment, the recording module (30, S39) records the information of the expiration notice being reserved. If the power saving mode is canceled, the notifying module notifies the expiration notice being reserved.

According to the yet still further embodiment, it is possible to execute the application program according to the timing that the user uses the communication terminal.

The other embodiment is a communication control method in a communication terminal (10) having a communication circuit (32), a processor (30), a table (340) that a plurality of timer times are registered and a storing module (46) stores a plurality of application programs that are started in response to expiration notice of a timer(s) and executed by the processor, the processor of the communication terminal executing following steps of: notifying (S41) expiration notice when reaching at a timer time that is registered in the table; executing (S63) at least two or more application programs when the notice of expiration is notified; and enabling (S83) the communication circuit when the application program is executed, wherein communication is performed by at least two or more application programs while the communication circuit is being enabled.

According to the other embodiment, since the number of times of enabling the communication circuit for data communication becomes fewer the electric power consumption can be suppressed.

The communication terminal and communication control method have been described in detail, but the above-mentioned description is illustrative in all aspects and the embodiments of the present disclosure are not intended to be limited thereto. The examples described above are applicable in combination as long as they do not contradict each other. Various modifications not exemplified are construed to be made without departing from the scope of the present disclosure.

The invention claimed is:

1. A communication terminal comprising:
   a communication circuit;
   at least one memory storing a plurality of applications and a table in which a plurality of times are registered, wherein each of the plurality of times is associated with at least one of the plurality of applications and represents a time at which the at least one application is to be executed for a communication; and
   at least one processor configured to
     receive a first time to be associated in the table with a first one of the plurality of applications and representing a time at which the first application is to be executed for a communication,
     receive a second time to be associated in the table with a second one of the plurality of applications and representing a time at which the second application is to be executed for a communication, wherein the second time is different than the first time,
     group the first application and the second application together, such that the first application and second application are both executed at a same time despite the different first and second times received for the first and second applications, wherein grouping the first application and the second application together comprises, when the second time is to be registered into the table, changing the second time to the first time based on the first time being within an allowance time period of the second time, and, when the first application and the second application are executed, enable the communication circuit to perform communication for the first application and the second application.

2. A communication terminal according to claim 1, wherein the at least one processor is further configured to calculate the allowance time period based on the second time and a time period from a current time to the second time.

3. A communication terminal according to claim 2, wherein calculating the allowance time period based on the second time and a time period from a current time to the second time comprises:
    calculating a time range as a predetermined percentage of the time period from the current time to the second time; and
    determining the allowance time period as the time range around the second time.

4. A communication terminal according to claim 1, wherein executing both the first application and the second application at the same time comprises executing both the first application and the second application at the first time.

5. A communication terminal comprising:
a communication circuit;
at least one memory storing a plurality of applications and a table in which a plurality of times are registered, wherein each of the plurality of times is associated with at least one of the plurality of applications and represents a time at which the at least one application is to be executed for a communication; and
at least one processor configured to
    receive a first time to be associated in the table with a first one of the plurality of applications and representing a time at which the first application is to be executed for a communication,
    receive a second time to be associated in the table with a second one of the plurality of applications and representing a time at which the second application is to be executed for a communication, wherein the second time is different than the first time,
    group the first application and the second application together, such that the first application and second application are both executed at a same time despite the different first and second times received for the first and second applications, wherein grouping the first application and the second application together comprises executing both the first application and the second application after expiration of a most subsequent one of the first time and the second time, and,
    when the first application and the second application are executed, enable the communication circuit to perform communication for the first application and the second application.

6. A communication terminal comprising:
a communication circuit;
at least one memory storing a plurality of applications and a table in which a plurality of times are registered, wherein each of the plurality of times is associated with at least one of the plurality of applications and represents a time at which the at least one application is to be executed for a communication; and
at least one processor configured to
    receive a first time to be associated in the table with a first one of the plurality of applications and representing a time at which the first application is to be executed for a communication,
    receive a second time to be associated in the table with a second one of the plurality of applications and representing a time at which the second application is to be executed for a communication, wherein the second time is different than the first time,
    group the first application and the second application together, such that the first application and second application are both executed at a same time despite the different first and second times received for the first and second applications, wherein grouping the first application and the second application together comprises executing both the first application and the second application upon expiration of a predetermined time period following an earliest one of the first time and the second time, and,
    when the first application and the second application are executed, enable the communication circuit to perform communication for the first application and the second application.

7. A communication terminal comprising:
a communication circuit;
at least one memory storing a plurality of applications and a table in which a plurality of times are registered, wherein each of the plurality of times is associated with at least one of the plurality of applications and represents a time at which the at least one application is to be executed for a communication; and
at least one processor configured to
    receive a first time to be associated in the table with a first one of the plurality of applications and representing a time at which the first application is to be executed for a communication,
    receive a second time to be associated in the table with a second one of the plurality of applications and representing a time at which the second application is to be executed for a communication, wherein the second time is different than the first time,
    group the first application and the second application together, such that the first application and second application are both executed at a same time despite the different first and second times received for the first and second applications, wherein grouping the first application and the second application together comprises executing both the first application and the second application when the communication circuit is enabled in response to a user operation, and,
    when the first application and the second application are executed, enable the communication circuit to perform communication for the first application and the second application.

8. A communication control method in a communication terminal having a communication circuit, at least one processor, a memory that stores a plurality of applications and a table in which a plurality of times are registered, wherein each of the plurality of times is associated with at least one of the plurality of applications and represents a time at which the at least one application is to be executed for a communication, wherein the method comprises, by the at least one processor:
    receiving a first time to be associated in the table with a first one of the plurality of applications and representing a time at which the first application is to be executed for a communication;

receiving a second time to be associated in the table with a second one of the plurality of applications and representing a time at which the second application is to be executed for a communication, wherein the second time is different than the first time;

grouping the first application and the second application together, such that the first application and second application are both executed at a same time despite the different first and second times received for the first and second applications, wherein grouping the first application and the second application together consists one of when the second time is to be registered into the table, changing the second time to the first time based on the first time being within an allowance time period of the second time, executing both the first application and the second application after expiration of a most subsequent one of the first time and the second time, executing both the first application and the second application upon expiration of a predetermined time period following an earliest one of the first time and the second time, and executing both the first application and the second application when the communication circuit is enabled in response to a user operation; and, when the first application and the second application are executed, enabling the communication circuit to perform communication for the first application and the second application.

* * * * *